United States Patent
Johanson

(10) Patent No.: US 9,365,183 B2
(45) Date of Patent: Jun. 14, 2016

(54) INFLATOR FOR AN AIRBAG, AN AIRBAG MODULE AND A VEHICLE COMPRISING SUCH AN AIRBAG MODULE

(75) Inventor: Mats Johanson, Fristad (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 149 days.

(21) Appl. No.: 14/117,074

(22) PCT Filed: May 22, 2012

(86) PCT No.: PCT/SE2012/050550
§ 371 (c)(1),
(2), (4) Date: Nov. 12, 2013

(87) PCT Pub. No.: WO2012/161647
PCT Pub. Date: Nov. 29, 2012

(65) Prior Publication Data
US 2014/0332092 A1 Nov. 13, 2014

(30) Foreign Application Priority Data

May 25, 2011 (EP) ..................................... 11167438

(51) Int. Cl.
*B60R 21/274* (2011.01)
(52) U.S. Cl.
CPC .......... *B60R 21/274* (2013.01); *Y10T 137/1692* (2015.04)
(58) Field of Classification Search
CPC ................... B60R 21/217; B60R 2021/26035; B60R 21/268
USPC ............... 280/736, 737, 740, 741; 137/68.19, 137/68.23, 69, 223–224
See application file for complete search history.

(56) References Cited

U.S. PATENT DOCUMENTS

| 5,063,958 | A | * | 11/1991 | Wisneskie et al. | ......... | 137/68.27 |
| 6,206,420 | B1 | | 3/2001 | Skanborg et al. | | |

(Continued)

FOREIGN PATENT DOCUMENTS

| DE | 19951672 A1 | 5/2001 |
| EP | 0862003 A2 | 9/1998 |

(Continued)

OTHER PUBLICATIONS

International Search Report and Written Opinion of the ISA for PCT/SE2012/050550, ISA/SE, Stockholm, SE, mailed Sep. 3, 2012.

*Primary Examiner* — Craig Schneider
*Assistant Examiner* — Daniel P Donegan
(74) *Attorney, Agent, or Firm* — Stephen T. Olson; Harness, Dickey & Pierce, P.L.C.

(57) ABSTRACT

A vehicle air-bag inflator includes a container initially containing a pressurized gas and having a vent opening in a wall thereof. A rupturable element, attached to a container wall, covers the vent opening, sealing the interior of the container. The rupturable element is attached to a first support, which supports a region of the rupturable element and prevents the rupturable element from rupturing. A first support, attached to a container wall, is movable between a first and a second configuration, with respect to the container wall. In an initial configuration, a second support supports the first support and prevents the first support from moving from a first configuration to a second configuration. In a final configuration, a second support allows the first support to move from the first configuration to the second configuration. An activation mechanism moves the second support from an initial configuration to a final configuration when triggered.

14 Claims, 4 Drawing Sheets

(56) References Cited

U.S. PATENT DOCUMENTS

| | | | |
|---|---|---|---|
| 6,247,725 B1* | 6/2001 | Moller | 280/737 |
| 6,612,326 B2* | 9/2003 | Specht et al. | 137/68.13 |
| 6,629,702 B2* | 10/2003 | Specht et al. | 280/737 |
| 6,669,232 B2* | 12/2003 | Specht | 280/736 |
| 6,672,616 B2* | 1/2004 | Jonsson et al. | 280/737 |
| 7,401,808 B2* | 7/2008 | Rossbach et al. | 280/737 |
| 7,665,763 B2* | 2/2010 | Bjorklund et al. | 280/737 |
| 7,695,009 B2* | 4/2010 | Johanson et al. | 280/737 |
| 8,128,123 B2* | 3/2012 | Johanson et al. | 280/737 |
| 2002/0074036 A1* | 6/2002 | Specht et al. | 137/68.13 |
| 2002/0130499 A1* | 9/2002 | Specht et al. | 280/736 |
| 2002/0130500 A1* | 9/2002 | Specht | 280/736 |
| 2002/0130502 A1* | 9/2002 | Jonsson et al. | 280/737 |
| 2003/0137134 A1 | 7/2003 | Welz | |
| 2007/0138775 A1* | 6/2007 | Rossbach | B60R 21/26 280/736 |
| 2008/0054611 A1* | 3/2008 | Johanson et al. | 280/737 |
| 2008/0284148 A1* | 11/2008 | Bjorklund et al. | 280/737 |
| 2010/0283231 A1* | 11/2010 | Johanson et al. | 280/735 |

FOREIGN PATENT DOCUMENTS

| | | |
|---|---|---|
| EP | 1778526 B1 | 5/2007 |
| GB | 2448300 A | 10/2008 |

* cited by examiner

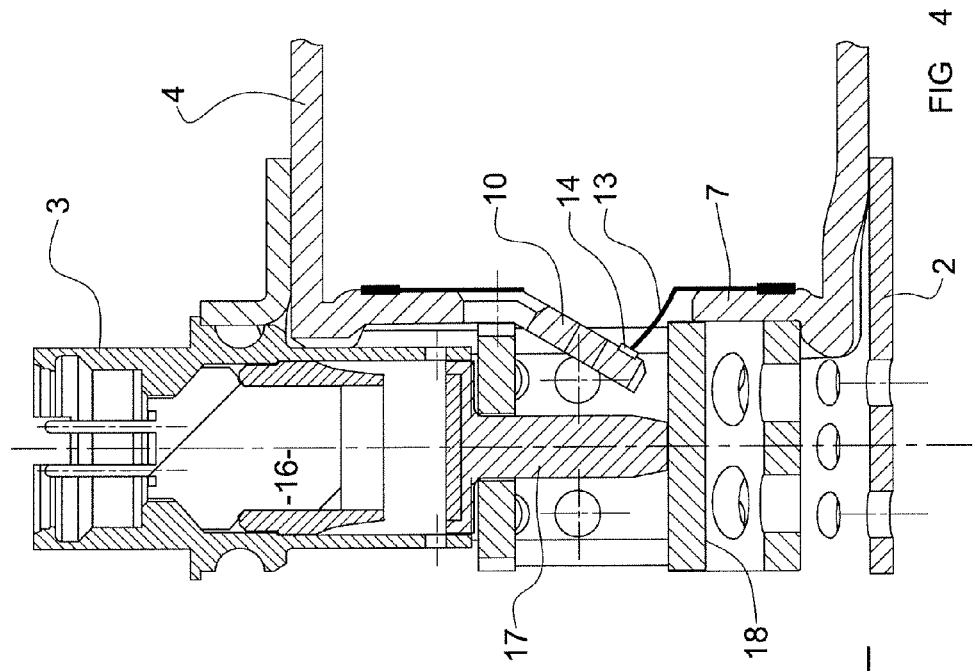
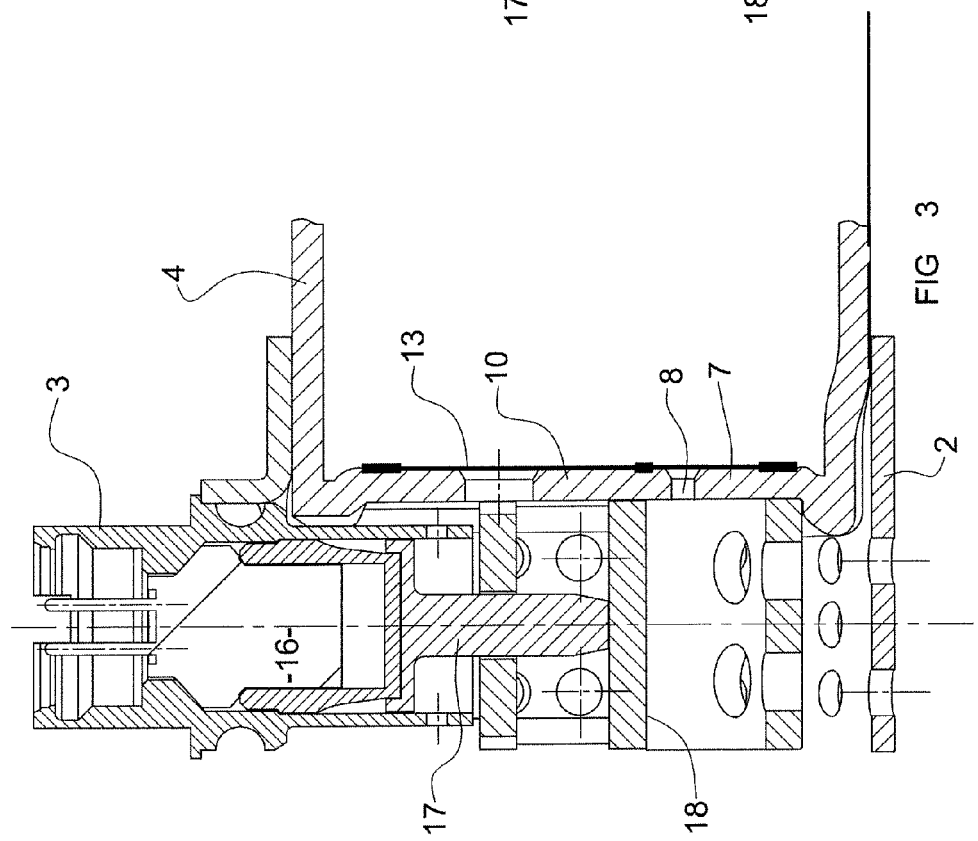

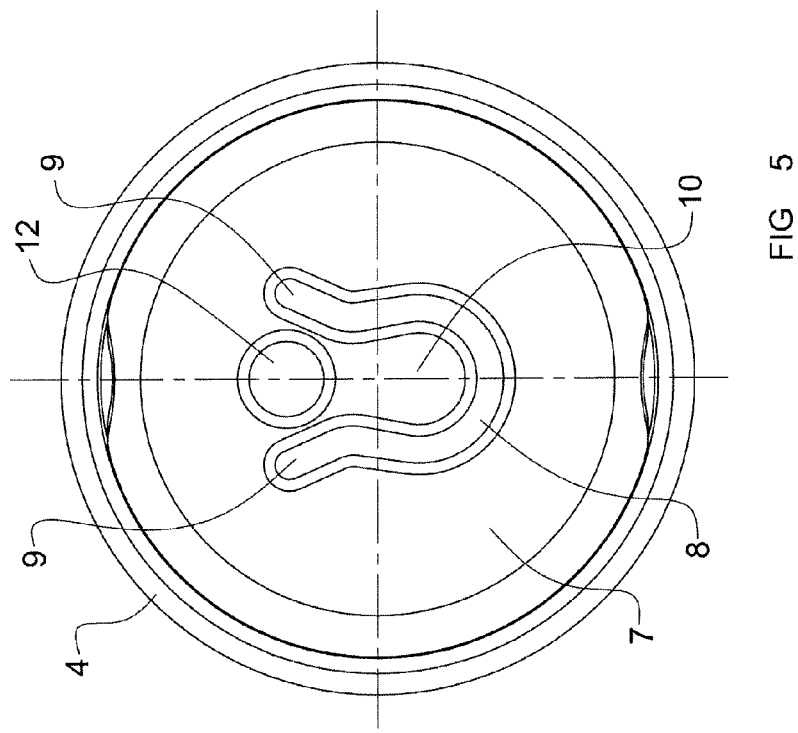
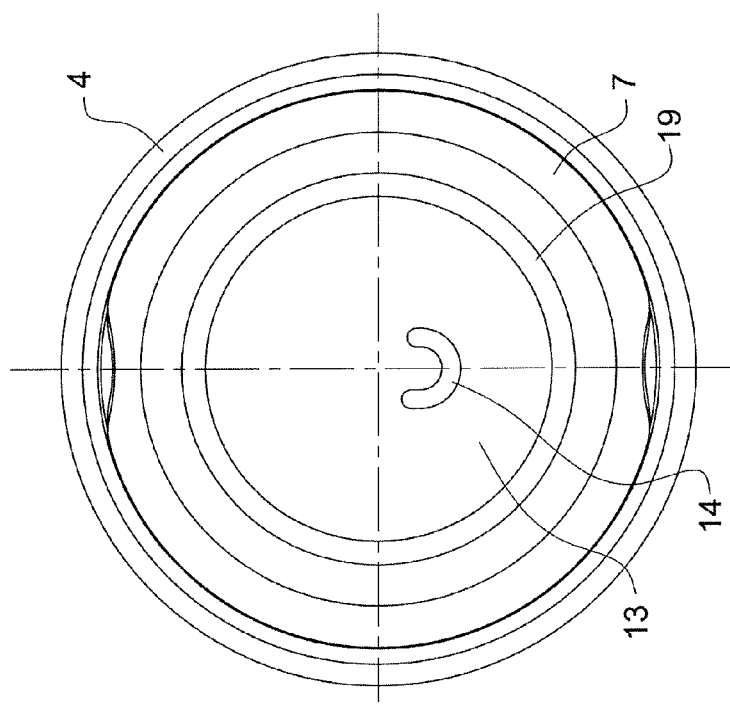
FIG 5

INFLATOR FOR AN AIRBAG, AN AIRBAG MODULE AND A VEHICLE COMPRISING SUCH AN AIRBAG MODULE

CROSS-REFERENCE TO RELATED APPLICATIONS

This application is a 371 U.S. National Stage of International Application No. PCT/SE2012/050550, filed May 22, 2012, which claims priority to European Patent Application No. EP 11167438.8, filed May 25, 2011. The disclosures of the above applications are incorporated by reference herein.

FIELD

The present invention relates to an air-bag, such as an air-bag provided in a vehicle to provide protection for an occupant of the vehicle in the event of an accident.

BACKGROUND

It has previously been proposed to provide air-bag inflators which incorporate one or two bottles of pressure vessels containing gas under pressure. Each bottle is initially sealed, for instance by a metal foil. The foil can be initially supported by means of a support element which is held in position against the exterior side of the foil. When the inflator is triggered the support element is moved away from the metal foil, enabling the foil to rupture under the pressure of the gas within the bottle, and enabling the gas to escape from the bottle and flow into the interior of the air-bag to inflate the air-bag.

In known inflators of this type one bottle may contain a fuel, in the form of an oxidisable gas, and another bottle may contain an oxidising gas. When these gases escape from the gas bottles they are mixed, and may subsequently be ignited within the air-bag to complete inflation of the air-bag. As an alternative only one bottle can be used, containing suitable reactive or non-reactive gases.

EP1778526 and U.S. Pat. No. 6,612,326 disclose arrangements of this type in which a support element is initially provided immediately behind a foil, and held in position by a flange of a piston head, or by a support that is arranged to be knocked out of position by a piston head. When the air-bag is to be triggered, the piston is driven so that the flange or support moves away from the region behind the support element, thus allowing the support element to move away from the foil, and so allowing the pressure of gas within the bottle to rupture the foil, pushing the support element away as this occurs.

In order for systems of this type to be effective, the foil must be relatively thin, and the pressure of gas within the bottle must be relatively high. If the foil is too thick, or the pressure of gas within the bottle is too low, there is a risk that the foil will bulge elastically and will not rupture at the required time, particularly in low-temperature conditions.

Other known systems do not include a movable support, and instead utilise an arrangement for actively piercing the foil. However, these systems inevitably involve additional moving parts, increasing the cost, complexity and likelihood of failure.

SUMMARY

It is an object of the present invention to provide an inflator which addresses at least some of the above problems.

Accordingly, one aspect of the present invention provides an inflator for a vehicle air-bag, the inflator comprising: a container initially containing a pressurised gas, the container having a vent opening formed in a wall thereof; a rupturable element which covers the vent opening, substantially sealing the interior of the container, the rupturable element being attached to the wall of the container at at least a first location; a first support which is attached to the wall of the container and movable with respect to the wall of the container between a first configuration, in which the first support supports a region of the rupturable element and prevents the rupturable element from rupturing, and a second configuration, the rupturable element being attached to the first support at at least a second location; a second support which, in an initial configuration, supports the first support and prevents the first support from moving from the first configuration to the second configuration, and which, in a final configuration, allows the first support to move from the first configuration to the second configuration; and an activation mechanism which, when triggered, moves the second support from the initial configuration to the final configuration.

Advantageously, when the first support is in the first configuration, there is a first distance between the first location and the second location; and when the first support is in the second configuration, there is a second distance between the first location and the second location, wherein the second distance is larger than the first distance.

Preferably, the portion of the rupturable element that initially extends between the first location and the second location is insufficiently elastic to stretch over the second distance, so that when the first support moves from the first configuration to the second configuration, the increase in distance between the first and second locations causes the rupturable element to rupture.

Advantageously, the activation mechanism comprises a piston element which drives the second support from the initial configuration to the final configuration.

Conveniently, the first support may move in a hinged manner between the first configuration and the second configuration.

Advantageously, the first support is formed integrally with the wall of the container.

Preferably, the vent aperture partially surrounds the first support, the first support forming a tongue or tab in the wall of the container.

Conveniently, the gap is generally "C"-shaped or "U"-shaped.

Advantageously, the gap comprises a widened portion.

Preferably, a further, separate aperture is formed through the wall of the container in a region that is initially covered by the rupturable element.

Conveniently, the inflator comprises a main body with an internal space, the container being attached to the main body so that the wall of the container separates the interior of the container from the internal space.

Advantageously, in the second configuration, the first support is deflected inwardly into the internal space.

Preferably, the inflator is connected to deliver gas into the interior of an air-bag.

Conveniently, the inflator comprises a second container which initially contains a second pressurised gas.

Another aspect of the present invention provides an air-bag module containing an inflator according to any of the above.

A further aspect of the present invention provides a vehicle containing an air-bag module according to the above.

DESCRIPTION OF THE DRAWINGS

In order that the present invention may be more readily understood embodiments thereof will now be described, by way of example, with reference to the accompanying drawings, in which:

FIGS. 3 and 4 show components of the inflator of FIGS. 1 and 2 before and after triggering, respectively; and FIG. 5 shows a part of a gas bottle forming part of an inflator embodying the present invention, before and after a rupturable foil is attached to the gas bottle.

DETAILED DESCRIPTION

Figure 1:
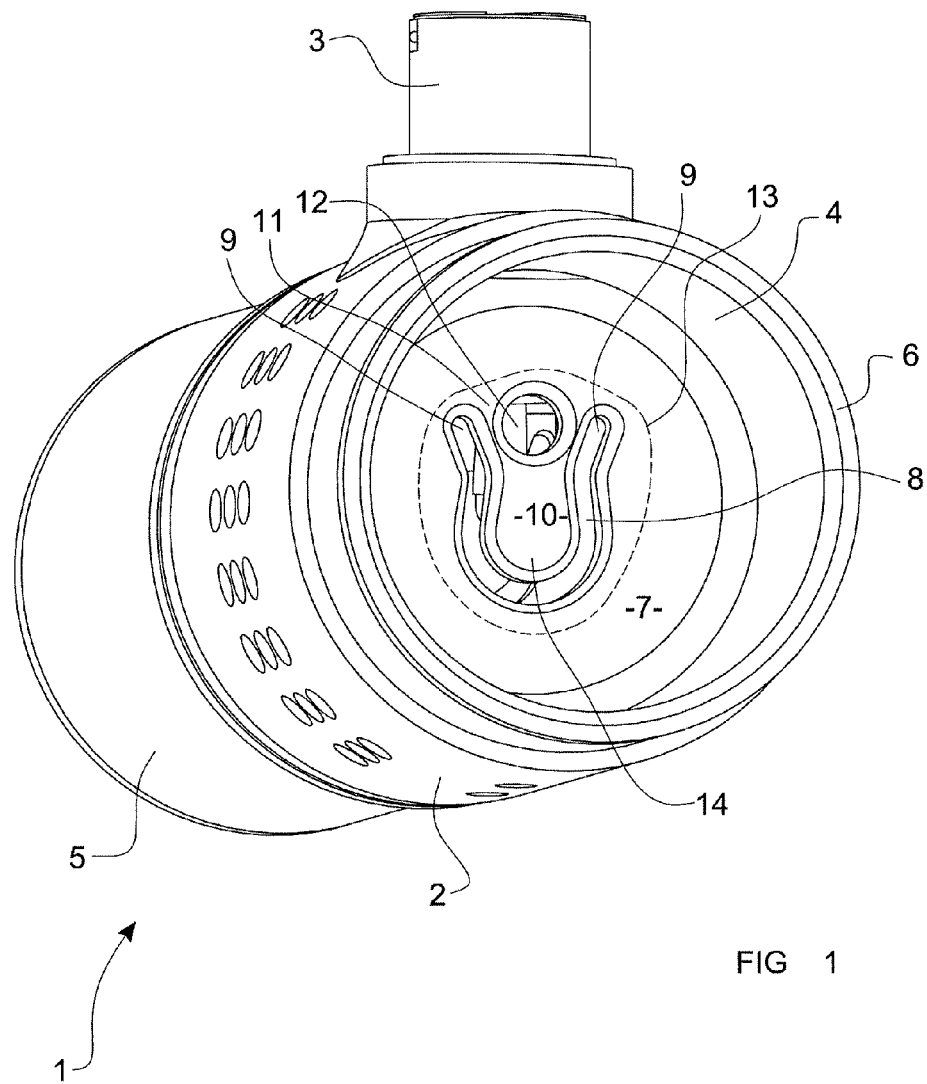
FIGS. 1 and 2 show components of an inflator embodying the present invention.

With reference firstly to FIG. 1, components of an inflator 1 embodying the present invention are shown. The inflator 1 comprises a main body 2, having a diffuser 3 for delivering gas into the interior of an air-bag (not shown), as is known in the art. The main body 2 is substantially hollow and cylindrical in form, having first and second open ends.

A pair of gas bottles 4,5 are attached to the open ends of the main body 2. The gas bottle 4 that is shown closest to the viewer in FIG. 1 is shown in cut-away form, so that the interior of the bottle 4 can be seen. The bottle 4 comprises a generally cylindrical side wall 6 and an end wall 7, which is generally planar. The side wall 6 and end wall 7 may be formed integrally with one another, or may be joined together in a gas-type fashion by any suitable manner, for instance by welding.

A vent aperture 8 is formed in the end wall 7 of the gas bottle 4. In the embodiments shown in FIG. 1, the vent aperture is generally "C"-shaped, taking the form of an arc whose ends 9 come relatively close to one another, but do not meet. A tab or tongue is defined within the arc shape 8, and comprises a first support 10, which is attached to the remainder of the end wall 7 by a relatively narrow connection 11, which lies between the ends 9 of the arc of the vent aperture 8.

A further aperture 12 is formed through the connection 11. The purpose of this further aperture 12 will be discussed below.

A rupturable foil 13, preferably of generally circular shape, is placed on the interior side of the end wall 7, and is shown in phantom in FIG. 1 for the purposes of clarity. The foil 13 completely covers the vent aperture 8, first support 10 and further aperture 12.

The foil 13 is attached to the interior surface of the end wall 7 by any suitable means, for instance by spot welding or continuous welding. In a preferred embodiment the foil 13 is welded to the end wall 7 all, or substantially all, of the way around its periphery.

The foil 13 is also attached to the first support 10, again preferably by welding. In a preferred embodiment the foil 13 is attached to the first support 10 at a location 14 which is near the free end of the first support 10 (i.e. a region of the first support 10 which is remote from the connection 11 by which the first support 10 is joined to the rest of the end wall 7).

Figure 2:
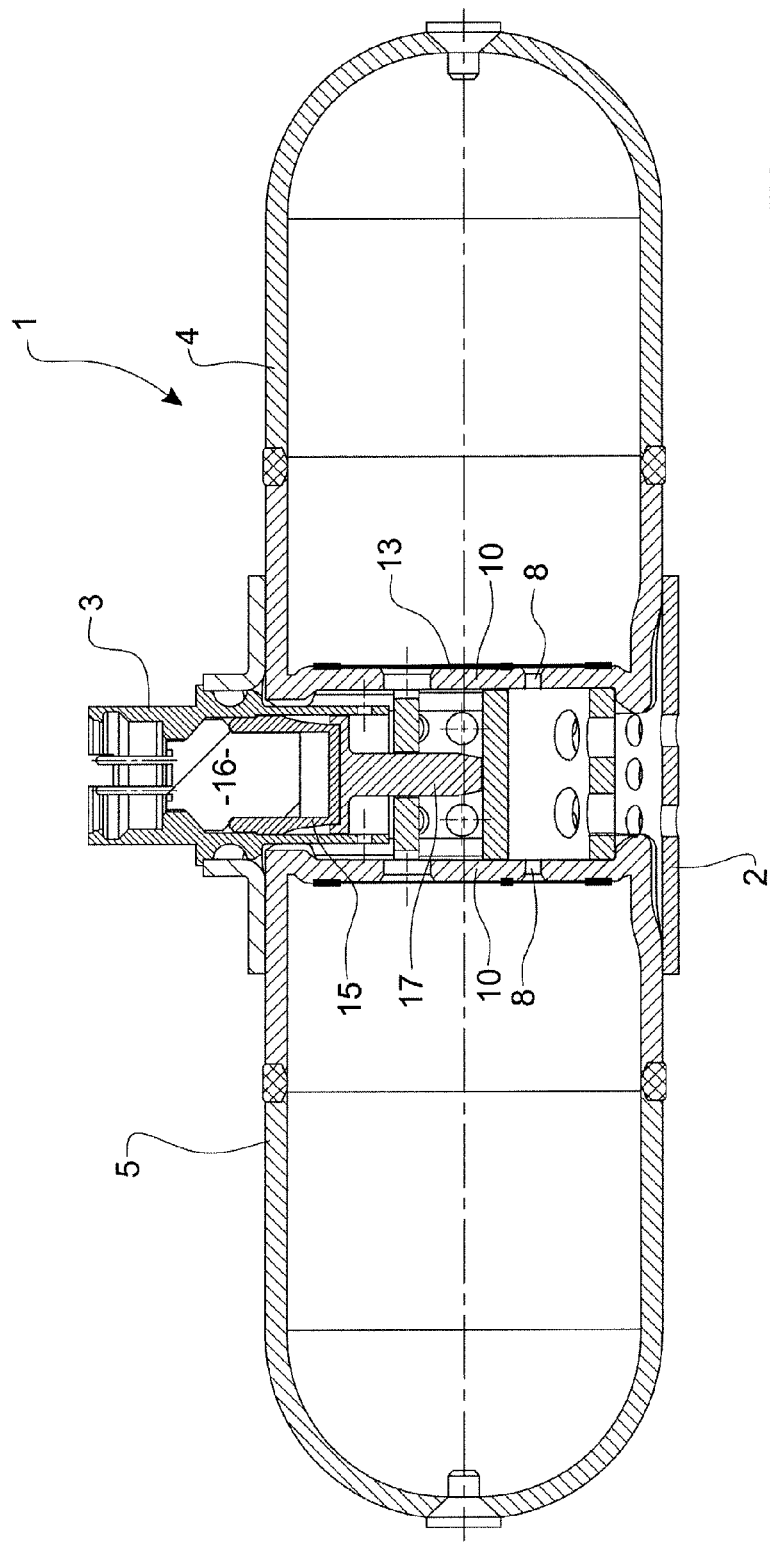

Referring to FIG. 2, a cross-sectional view of the inflator 1 is shown. It can be seen that the other gas bottle 5 has a similar arrangement of a vent aperture 8 in its end wall 7, with a rupturable foil 13 covering the vent aperture 8.

In the space within the main body 2 of the inflator 1, between the end walls 7 of the gas bottles 4,5, is a piston arrangement 15 having a squib 16 which, when ignited, is adapted to drive a piston head 17. In the preferred embodiment shown in FIG. 2, the squib 16 is located close to the diffuser 3, and is adapted to drive the piston head 17 in a direction towards the far end of the main body 2, i.e. away from the diffuser 3.

The piston head 17 has an outwardly-extending flange which forms a second support 18, and which extends substantially across the entire width of the central space of the main body 2. In an initial configuration, before ignition of the squib 16, the second support 18 lies between the first supports 10 of the two gas bottles 4,5, thus bracing the first supports 10 and preventing the first supports 10 from moving inwardly into the central space of the main body 2. In preferred embodiments the second support 18 braces each support 10 at a region near its free end.

FIGS. 3 and 4 show the sequence of events when the air-bag is triggered. FIG. 3 shows the initial state of the inflator, which is discussed above. At the beginning of the process the squib 16 is activated, which drives (as discussed above) the piston head 17, to the right in the orientation of FIGS. 3 and 4.

FIG. 4 shows the situation after the piston head 17 has been driven by the ignition of the squib 16. The second support 18 is driven away from the region behind the first support 10, and there is therefore nothing preventing the first support 10 from moving inwardly into the interior space of the main body 2. The first support 10 will therefore be driven inwardly by the pressure of gas within the bottle 4. As this occurs, the narrow connection 11 by which the first support 10 is attached to the end wall 7 will preferably deform and act as a hinge as the first support 10 is driven inwardly.

As this occurs, the foil 13 will be actively ruptured, as the foil 13 is attached both to the end wall 7 of the bottle 4, in a region near the first support 10, and to the first support 10 itself. The distance between these two points of connection will increase when the first support 10 moves inwardly into the interior space of the main body 2. This increase in distance is such that the foil 13 must rupture, as the foil 13 is formed to be insufficiently elastic to stretch by this amount without rupturing.

It will therefore be appreciated that the attachment of the foil 13 both to the first support 10 and to the wall 7 of the bottle 4 near the first support 10 ensures that the foil 13 is actively ruptured when the second support 18 is removed from the first support 10.

If the foil 13 was not connected to the first support 10, then when the first support 10 deflected inwardly the foil 13 would be able to bulge uniformly over the entire area of the vent aperture 8, thus accommodating a relatively large pressure difference before the elastic limit of the foil 13 is reached. However, in embodiments of the present invention the foil 13 is stretched between two points of fixation as the first support 10 is deflected inwardly, thus overcoming the elastic limit of the foil 13 much more swiftly and reliably, without such a large pressure difference being needed.

As only the first gas bottle 4 is shown in FIGS. 3 and 4, it will be appreciated that a similar or identical arrangement may be provided for the second gas bottle 5, and hence that both gas bottles 4,5 may be opened simultaneously by the driving of the piston head 17 so that the second support 18 is removed from the region between the first supports 10 of the first and second gas bottles 4,5.

The skilled person will appreciate that gas from the interior of the first bottle 4 will, once the foil 13 has been ruptured, be able to flow into the interior of the main body 2, and subsequently out through the diffuser 3 into the interior of an air-bag. If two gas bottles 4,5 are provided, the gases from these two bottles 4,5 may mix within the main body 2 and subsequently be introduced together into the interior of the air-bag, where they may be ignited, as is known in the art.

It will be appreciated that the embodiments discussed above allow for consistent and reliable opening of gas bottles with a minimum number of moving parts.

FIG. 5 shows a cut-away end of a gas bottle 4, before and after a foil 13 is attached to the end wall 7 of the bottle 4.

As can be seen in the right-hand portion of FIG. 5, the vent aperture 8 is generally arcuate and defines a first support 10 in the form of a tab or tongue within the arc.

A secondary aperture 12 is preferably formed between the two ends 9 of the vent aperture 8. Positioning the secondary aperture 12 in this location helps to form a line of weakness, passing generally through the two ends 9 of the vent aperture 8 and the secondary aperture 12, ensuring that the first support 10 can flex inwardly around this line of weakness when the second support 18 is removed.

The secondary aperture 12 can also act as a safety valve, in case the pressure of gas within the bottle 4 becomes too high—the foil 13 may rupture solely in the region of the secondary aperture 12, and this may prevent the gas bottle from exploding, for instance under conditions of extremely high temperature. In alternative designs the secondary aperture 12 may be formed integrally with the vent aperture 8, so that one of the ends 9 of the vent aperture runs into the secondary aperture 12. Alternatively, the secondary aperture 12 may be omitted entirely.

In the left-hand portion of FIG. 5 the foil 13 is shown in position. The foil 13 is welded around its periphery (indicated by reference numeral 19) to the end wall 7, and is also welded at a point 14 to the first support 10. The point 14 at which the foil 13 is attached to the first support 10 may act as a crack initiator or stress concentrator, to help initiate the rupturing of the foil 13. The foil 13 may be welded to the first support 10 at a single point or in a line (which may be generally parallel with, or perpendicular to, the longitudinal axis of the first support 10), or may alternatively form a square, circular or part-circular shape, or any other appropriate shape.

It has been found that systems embodying the present invention allow the use of a thicker foil. Current designs of inflator use a foil formed from 0.15 mm Inconel™, and if a thicker foil is used then the foil will not rupture reliably. However, by using embodiments of the present invention it has been found that a 0.2 mm Inconel foil may be used, and the foil may be ruptured reliably, when the inflator is triggered. This is advantageous because, for example, a thicker foil will be more robust against pressure and temperature cycling, and the useful lifetime of the inflator will therefore be extended.

In addition, the internal volume of the main body 2 can be minimised, as a small number of moving parts are required.

Further, in previous designs the vent aperture formed in the end wall of the or each gas bottle needed to be relatively large, to ensure that the foil would rupture. This in turn required a relatively large support, and a considerable amount of space was required within the main body to allow this support to move inwardly.

By contrast, in embodiments of the present invention the first support 10 may be formed to be relatively small, thus less space is required within the main body to allow the first support to deflect inwardly.

The attachment of the first support 10 to the wall 7 of the gas bottle 4 reduces the number of components of the inflator 2 and simplifies the design. In preferred embodiments of the present invention, the first support 10 is formed integrally with the end wall 7 of the gas bottle 4. This makes the construction of the inflator particularly 2 simple and robust. However, in other embodiments the first support 10 may be attached to the end wall 4, for instance by way of welding.

It will be appreciated that embodiments of the present invention provide a compact and reliable inflator that will find application in many fields, particularly in the field of vehicle air-bags.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An inflator for a vehicle air-bag, the inflator comprising:
    a container initially containing a pressurised gas, the container having a vent opening formed in a wall thereof;
    a rupturable element which covers the vent opening, substantially sealing the interior of the container, the rupturable element attached to the wall of the container;
    a first support which is attached to the wall of the container and movable with respect to the wall of the container between a first configuration, in which the first support supports a region of the rupturable element and prevents the rupturable element from rupturing, and a second configuration, the rupturable element being attached to the first support;
    a second support which, in an initial configuration, supports the first support and prevents the first support from moving from the first configuration to the second configuration, and which, in a final configuration, allows the first support to move from the first configuration to the second configuration; and
    an activation mechanism operative to move the second support from the initial configuration to the final configuration when triggered,
    wherein the first support is formed integrally with the wall of the container and the rupturable element is attached to both the wall and the first support.

2. The inflator according to claim 1, wherein:
    when the first support is in the first configuration, there is a first distance between a first location at which the rupturable element is attached to the wall of the container and a second location at which the rupturable element is attached to the first support; and
    when the first support is in the second configuration, there is a second distance between the first location and the second location, the second distance being larger than the first distance.

3. The inflator according to claim 2, wherein a portion of the rupturable element that initially extends between the first location and the second location is insufficiently elastic to stretch over the second distance, so that when the first support moves from the first configuration to the second configuration, an increase in distance between the first and second locations causes the rupturable element to rupture.

4. The inflator according to claim 1, wherein the activation mechanism comprises a piston element which drives the second support from the initial configuration to the final configuration.

5. The inflator according to claim 1, wherein the first support is movable in a hinged manner between the first configuration and the second configuration.

6. The inflator according to claim 1, wherein the vent aperture partially surrounds the first support, the first support forming a tongue or tab in the wall of the container.

7. The inflator according to claim 6, wherein a further, separate aperture is formed through the wall of the container in a region that is initially covered by the rupturable element.

8. The inflator according to claim 1, further comprising a main body with an internal space, the container being attached to the main body so that the wall of the container separates the interior of the container from the internal space.

9. The inflator according to claim 8, wherein the first support is deflected inwardly into the internal space in the second configuration.

10. The inflator according to claim 1, in combination with the air-bag, the inflator connected to deliver gas into an interior of an air-bag.

11. The inflator according to claim 1, in combination with an air-bag module including an air-bag.

12. The combination of claim 11 in further combination with a vehicle, the air-bag module mounted in the vehicle.

13. The inflator according to claim 1, wherein the first support is connected to the wall through a deformable connection.

14. The inflator according to claim 13, wherein the first support is driven inwardly from the first position to the second position by a pressure of gas within the container.

* * * * *